United States Patent
Lohan et al.

(10) Patent No.: US 10,171,720 B2
(45) Date of Patent: Jan. 1, 2019

(54) CAMERA CONTROL APPLICATION

(71) Applicant: Nokia Technologies Oy, Espoo (FI)

(72) Inventors: Florin Cristian Lohan, Tampere (FI); John Martin, San Francisco, CA (US); Andrew Borovsky, New York, NY (US); Graham Phillip Oldfield, South Woodford (GB); Richard Michael Collin, East Sussex (GB); Antero Taivalsaari, Siivikkala (FI); Lauri Paimen, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/369,364

(22) PCT Filed: Dec. 26, 2012

(86) PCT No.: PCT/US2012/071628
§ 371 (c)(1),
(2) Date: Jun. 27, 2014

(87) PCT Pub. No.: WO2013/101813
PCT Pub. Date: Jul. 4, 2013

(65) Prior Publication Data
US 2014/0375834 A1 Dec. 25, 2014

(30) Foreign Application Priority Data

Dec. 28, 2011 (WO) ................. PCT/EP2011/074182
Mar. 20, 2012 (GB) .................................. 1204857.5

(51) Int. Cl.
*H04N 5/232* (2006.01)
*G06Q 10/10* (2012.01)

(52) U.S. Cl.
CPC ....... *H04N 5/23203* (2013.01); *G06Q 10/101* (2013.01); *H04N 5/23216* (2013.01)

(58) Field of Classification Search
CPC .......... H04N 5/23203; H04N 5/23216; G06Q 10/101
See application file for complete search history.

(56) References Cited

U.S. PATENT DOCUMENTS 5,016,166 A 5/1991 Van Loo et al.
5,127,098 A 6/1992 Rosenthal et al.
(Continued)

FOREIGN PATENT DOCUMENTS

CN 1625229 A 6/2005
CN 1658149 8/2005
(Continued)

OTHER PUBLICATIONS

International Search Report and Written Opinion received for corresponding Patent Cooperation Treaty Application No. PCT/EP2011/074182, dated Apr. 4, 2012, 10 pages.
(Continued)

*Primary Examiner* — Christopher K Peterson
(74) *Attorney, Agent, or Firm* — Alston & Bird LLP

(57) ABSTRACT

An apparatus comprising: at least one processor; and at least one memory including computer program code, the at least one memory and the computer program code configured to, with the at least one processor, cause the apparatus to perform at least the following: receive a user input; and based on the user input, provide an open instance of a first camera control application on a first apparatus as a corresponding open instance of an at least related camera control application on a second apparatus.

20 Claims, 8 Drawing Sheets

(56) References Cited

U.S. PATENT DOCUMENTS

| | | | |
|---|---|---|---|
| 6,154,843 A | 11/2000 | Hart, Jr. et al. | |
| 6,311,209 B1 | 10/2001 | Olson et al. | |
| 6,463,299 B1 | 10/2002 | Macor | |
| 6,545,669 B1 | 4/2003 | Kinawi et al. | |
| 6,906,646 B1 | 6/2005 | Mills et al. | |
| 6,947,975 B2 | 9/2005 | Wong et al. | |
| 7,363,342 B1 | 4/2008 | Wang et al. | |
| 7,371,177 B2 | 5/2008 | Ellis et al. | |
| 7,475,397 B1 | 1/2009 | Garthwaite et al. | |
| 7,479,949 B2 | 1/2009 | Jobs et al. | |
| 7,529,824 B2 | 5/2009 | Joseph | |
| 7,532,196 B2 | 5/2009 | Hinckley | |
| 7,533,189 B2 | 5/2009 | Mahajan et al. | |
| 7,536,034 B2 | 5/2009 | Rhoads et al. | |
| 7,620,906 B2 | 11/2009 | Igeta | |
| 7,623,892 B2 | 11/2009 | Hawkins | |
| 7,636,794 B2 | 12/2009 | Ramos et al. | |
| 7,703,073 B2 | 4/2010 | Illowsky et al. | |
| 7,716,286 B2 | 5/2010 | Heins et al. | |
| 7,761,885 B2 | 7/2010 | Labrou et al. | |
| 7,817,991 B2 | 10/2010 | Hinckley et al. | |
| 7,860,019 B2 | 12/2010 | Zhang et al. | |
| 7,890,517 B2 | 2/2011 | Angelo et al. | |
| 7,920,169 B2 | 4/2011 | Jung et al. | |
| 7,958,453 B1 | 6/2011 | Taing | |
| 7,991,896 B2 | 8/2011 | Shen et al. | |
| 8,019,867 B1 | 9/2011 | Allen et al. | |
| 8,078,646 B2 | 12/2011 | Das et al. | |
| 8,214,747 B1 | 7/2012 | Yankovich et al. | |
| 8,224,894 B1 | 7/2012 | Parks et al. | |
| 8,255,360 B1 | 8/2012 | Wallace et al. | |
| 8,332,606 B2 | 12/2012 | Boldyrev et al. | |
| 8,588,824 B2 | 11/2013 | Rowe | |
| 8,656,080 B2 | 2/2014 | Shin | |
| 8,751,444 B2 | 6/2014 | Wallace et al. | |
| 8,812,987 B2 | 8/2014 | Joynes et al. | |
| 8,874,585 B2 | 10/2014 | Oliver et al. | |
| 2002/0116455 A1 | 8/2002 | Mitchell et al. | |
| 2003/0126136 A1 | 7/2003 | Omoigui | |
| 2004/0006551 A1 | 1/2004 | Sahinoja et al. | |
| 2004/0019676 A1 | 1/2004 | Iwatsuki et al. | |
| 2004/0024819 A1 | 2/2004 | Sasaki et al. | |
| 2004/0054690 A1 | 3/2004 | Hillerbrand et al. | |
| 2004/0117409 A1 | 6/2004 | Scahill et al. | |
| 2004/0150664 A1 | 8/2004 | Baudisch | |
| 2004/0150724 A1* | 8/2004 | Nozaki | H04N 1/00347 348/211.4 |
| 2004/0203891 A1 | 10/2004 | Cole et al. | |
| 2004/0230636 A1 | 11/2004 | Masuoka et al. | |
| 2005/0028221 A1 | 2/2005 | Liu et al. | |
| 2005/0030255 A1 | 2/2005 | Chiu et al. | |
| 2005/0055330 A1 | 3/2005 | Britton et al. | |
| 2005/0060179 A1 | 3/2005 | Tinberg et al. | |
| 2005/0086309 A1 | 4/2005 | Galli et al. | |
| 2005/0120096 A1 | 6/2005 | Rekimoto et al. | |
| 2005/0165795 A1 | 7/2005 | Myka et al. | |
| 2005/0168399 A1 | 8/2005 | Palmquist | |
| 2005/0198578 A1 | 9/2005 | Agrawala et al. | |
| 2005/0204141 A1 | 9/2005 | Sayers et al. | |
| 2005/0204296 A1 | 9/2005 | Rossler et al. | |
| 2005/0219211 A1 | 10/2005 | Kotzin et al. | |
| 2005/0219223 A1 | 10/2005 | Kotzin et al. | |
| 2005/0254514 A1 | 11/2005 | Lynn | |
| 2005/0289134 A1 | 12/2005 | Noguchi | |
| 2005/0289558 A1 | 12/2005 | Illowsky et al. | |
| 2006/0004834 A1 | 1/2006 | Pyhalammi et al. | |
| 2006/0028458 A1 | 2/2006 | King et al. | |
| 2006/0041893 A1 | 2/2006 | Castro et al. | |
| 2006/0101054 A1 | 5/2006 | Dempski et al. | |
| 2006/0123011 A1 | 6/2006 | Stillion et al. | |
| 2006/0123039 A1 | 6/2006 | Scheuerle, Jr. et al. | |
| 2006/0236302 A1 | 10/2006 | Bateman et al. | |
| 2006/0236307 A1 | 10/2006 | Debruin et al. | |
| 2006/0242278 A1 | 10/2006 | Hawkins | |
| 2006/0284758 A1 | 12/2006 | Stilwell et al. | |
| 2006/0284785 A1 | 12/2006 | Bitterlich | |
| 2006/0284795 A1 | 12/2006 | Akiyama et al. | |
| 2007/0054627 A1* | 3/2007 | Wormald | G06F 9/4856 455/70 |
| 2007/0118394 A1 | 5/2007 | Cahoon | |
| 2007/0124503 A1* | 5/2007 | Ramos | G06F 3/017 709/248 |
| 2007/0127426 A1 | 6/2007 | Watters et al. | |
| 2007/0146347 A1 | 6/2007 | Rosenberg | |
| 2007/0242061 A1 | 10/2007 | Rhoten et al. | |
| 2007/0250645 A1 | 10/2007 | Meadows et al. | |
| 2008/0081558 A1 | 4/2008 | Dunko et al. | |
| 2008/0104032 A1 | 5/2008 | Sarkar | |
| 2008/0120343 A1 | 5/2008 | Altrichter et al. | |
| 2008/0154907 A1 | 6/2008 | Prasad et al. | |
| 2008/0160974 A1 | 7/2008 | Vartiainen et al. | |
| 2008/0207128 A1 | 8/2008 | Mikko | |
| 2008/0215989 A1 | 9/2008 | Kravtsova et al. | |
| 2008/0288913 A1 | 11/2008 | Creighton et al. | |
| 2008/0294644 A1 | 11/2008 | Liu et al. | |
| 2008/0297608 A1* | 12/2008 | Border | H04N 1/00204 348/207.11 |
| 2009/0006946 A1 | 1/2009 | Hanson et al. | |
| 2009/0031258 A1 | 1/2009 | Arrasvuori et al. | |
| 2009/0058830 A1 | 3/2009 | Herz et al. | |
| 2009/0119572 A1 | 5/2009 | Koivunen | |
| 2009/0143056 A1 | 6/2009 | Tang et al. | |
| 2009/0172101 A1 | 7/2009 | Arthursson | |
| 2009/0172565 A1 | 7/2009 | Jackson et al. | |
| 2009/0172671 A1 | 7/2009 | Bobak et al. | |
| 2009/0177777 A1 | 7/2009 | Behrendt et al. | |
| 2009/0204966 A1 | 8/2009 | Johnson et al. | |
| 2009/0213032 A1 | 8/2009 | Newport et al. | |
| 2009/0216714 A1 | 8/2009 | Gonzalez et al. | |
| 2009/0265686 A1 | 10/2009 | Lucas et al. | |
| 2009/0300493 A1 | 12/2009 | Hamilton, II et al. | |
| 2009/0303676 A1 | 12/2009 | Behar et al. | |
| 2009/0313645 A1 | 12/2009 | Sathish et al. | |
| 2009/0327302 A1 | 12/2009 | Richardson et al. | |
| 2010/0054242 A1 | 3/2010 | Oliver et al. | |
| 2010/0057815 A1 | 3/2010 | Spivack et al. | |
| 2010/0066643 A1 | 3/2010 | King et al. | |
| 2010/0070740 A1 | 3/2010 | Allen et al. | |
| 2010/0071038 A1 | 3/2010 | Flynn et al. | |
| 2010/0082136 A1 | 4/2010 | Rosenblatt et al. | |
| 2010/0093399 A1 | 4/2010 | Kim et al. | |
| 2010/0138756 A1 | 6/2010 | Saund et al. | |
| 2010/0156812 A1 | 6/2010 | Stallings et al. | |
| 2010/0167646 A1 | 7/2010 | Alameh et al. | |
| 2010/0185956 A1 | 7/2010 | Anantharaman et al. | |
| 2010/0198778 A1 | 8/2010 | Venugopal et al. | |
| 2010/0231735 A1 | 9/2010 | Burian et al. | |
| 2010/0241634 A1 | 9/2010 | Madhok | |
| 2010/0257251 A1 | 10/2010 | Mooring et al. | |
| 2010/0259486 A1 | 10/2010 | Anson et al. | |
| 2010/0262925 A1 | 10/2010 | Liu et al. | |
| 2010/0274804 A1 | 10/2010 | Muskal et al. | |
| 2010/0274858 A1 | 10/2010 | Lindberg et al. | |
| 2010/0281363 A1 | 11/2010 | Inaba | |
| 2010/0281395 A1 | 11/2010 | Apted | |
| 2010/0287513 A1 | 11/2010 | Singh et al. | |
| 2010/0293106 A1 | 11/2010 | Rhoads et al. | |
| 2010/0299436 A1 | 11/2010 | Khalid et al. | |
| 2011/0018982 A1 | 1/2011 | Shibamiya et al. | |
| 2011/0019001 A1 | 1/2011 | Rhoads et al. | |
| 2011/0058052 A1 | 3/2011 | Bolton et al. | |
| 2011/0065384 A1 | 3/2011 | Cader et al. | |
| 2011/0066871 A1 | 3/2011 | Farmer et al. | |
| 2011/0081923 A1 | 4/2011 | Forutanpour et al. | |
| 2011/0083111 A1 | 4/2011 | Forutanpour et al. | |
| 2011/0083130 A1 | 4/2011 | Boldyrev et al. | |
| 2011/0088002 A1 | 4/2011 | Freer | |
| 2011/0098056 A1 | 4/2011 | Rhoads et al. | |
| 2011/0107227 A1 | 5/2011 | Rempell et al. | |
| 2011/0113138 A1 | 5/2011 | Tyrkko et al. | |
| 2011/0117898 A1 | 5/2011 | Pereira et al. | |
| 2011/0126141 A1 | 5/2011 | King et al. | |
| 2011/0131299 A1 | 6/2011 | Sardary | |
| 2011/0138381 A1 | 6/2011 | Hauser | |

(56) References Cited

U.S. PATENT DOCUMENTS

| | | |
|---|---|---|
| 2011/0158138 A1 | 6/2011 | Vivek |
| 2011/0161076 A1 | 6/2011 | Davis et al. |
| 2011/0165841 A1* | 7/2011 | Baek .................. H04L 67/10 |
| | | 455/41.2 |
| 2011/0197153 A1 | 8/2011 | King et al. |
| 2011/0239114 A1 | 9/2011 | Falkenburg et al. |
| 2011/0244919 A1 | 10/2011 | Aller et al. |
| 2011/0258430 A1 | 10/2011 | Luukkala et al. |
| 2011/0276911 A1 | 11/2011 | Choi |
| 2011/0289147 A1 | 11/2011 | Styles et al. |
| 2011/0289157 A1 | 11/2011 | Pirnazar |
| 2011/0289520 A1 | 11/2011 | Grigoriev et al. |
| 2011/0307841 A1 | 12/2011 | Boldyrev et al. |
| 2011/0307857 A1 | 12/2011 | Lucas et al. |
| 2012/0084356 A1 | 4/2012 | Ferdi |
| 2012/0096076 A1 | 4/2012 | Chan |
| 2012/0139951 A1 | 6/2012 | Hwang et al. |
| 2012/0290657 A1 | 11/2012 | Parks et al. |
| 2012/0290730 A1 | 11/2012 | Desai et al. |
| 2012/0317508 A1 | 12/2012 | Schone et al. |
| 2013/0007499 A1 | 1/2013 | Moy |
| 2013/0013560 A1 | 1/2013 | Goldberg et al. |
| 2013/0046935 A1 | 2/2013 | Ramanathan |
| 2013/0047008 A1 | 2/2013 | Shin |
| 2013/0097234 A1 | 4/2013 | Beinvel et al. |
| 2013/0262706 A1 | 10/2013 | Stahlberg et al. |
| 2013/0275994 A1 | 10/2013 | Uola et al. |

FOREIGN PATENT DOCUMENTS

| | | |
|---|---|---|
| CN | 1682546 A | 10/2005 |
| CN | 101095110 | 12/2007 |
| CN | 101421686 A | 4/2009 |
| CN | 101534411 A | 9/2009 |
| CN | 101662667 A | 3/2010 |
| CN | 101764933 A | 6/2010 |
| CN | 102150126 | 8/2011 |
| CN | 102150126 A | 8/2011 |
| CN | 102202355 A | 9/2011 |
| CN | 102238281 A | 11/2011 |
| EP | 1215575 A2 | 6/2002 |
| EP | 1760584 A1 | 3/2007 |
| EP | 2106186 A1 | 9/2009 |
| EP | 2161960 A2 | 3/2010 |
| EP | 2261793 A2 | 12/2010 |
| EP | 2385462 A1 | 11/2011 |
| EP | 2487871 A1 | 8/2012 |
| GB | 2358778 A | 8/2001 |
| GB | 2384064 A | 7/2003 |
| GB | 2468893 A | 9/2010 |
| GB | 2498229 A | 7/2013 |
| JP | H11-95931 A | 4/1999 |
| JP | 2006-339835 A | 12/2006 |
| JP | 2009-130876 A | 6/2009 |
| JP | 2010-262330 A | 11/2010 |
| JP | 2011-065518 A | 3/2011 |
| KR | 2011-0056314 A | 5/2011 |
| KR | 2011 0056314 A | 5/2011 |
| KR | 2011 0080348 A | 7/2011 |
| KR | 2011-0080348 A | 7/2011 |
| KR | 2011-0123099 A | 11/2011 |
| WO | 2005/051020 A1 | 6/2005 |
| WO | 2005/109829 A1 | 11/2005 |
| WO | 2009/152316 A1 | 12/2009 |
| WO | 2010/028405 A1 | 3/2010 |
| WO | 2010/063873 A1 | 6/2010 |
| WO | 2011127201 | 10/2011 |
| WO | 2013/097878 A1 | 7/2013 |
| WO | WO 2013/097878 A1 | 7/2013 |

OTHER PUBLICATIONS

International Search Report and Written Opinion received for corresponding Patent Cooperation Treaty Application No. PCT/FI2013/050198, dated Jun. 6, 2013, 20 pages.

International Search Report and Written Opinion received for corresponding Patent Cooperation Treaty Application No. PCT/EP2011/074178, dated May 22, 2012, 9 pages.

International Search Report and Written Opinion received for corresponding Patent Cooperation Treaty Application No. PCT/EP2011/074193, dated Sep. 28, 2012, 13 pages.

Search Report received for corresponding United Kingdom Patent Application No. 1204842.7, dated May 28, 2012, 4 pages.

Search Report received for corresponding United Kingdom Patent Application No. 1204849.2, dated May 28, 2012, 4 pages.

Search Report received for corresponding United Kingdom Patent Application No. 1204857.5, dated May 28, 2012, 4 pages.

Bagrodia et al., "iMash: Interactive Mobile Application Session Handoff", Proceedings of the First International Conference on Mobile Systems, Applications and Services, May 5-8, 2003, pp. 259-272.

Chong et al., "GesturePIN: Using Discrete Gestures for Associating Mobile Devices", Proceedings of the 12th international conference on Human computer interaction with mobile devices and services, Sep. 7-10, 2010, pp. 261-264.

De Carvalho et al., "Synchronizing Web Browsing Data with Browserver", IEEE Symposium on Computers and Communications (ISCC), Jun. 22-25, 2010, 6 pages.

Menges et al., "Inverting X: An Architecture for a Shared Distributed Window System", Third Workshop on Enabling Technologies: Infrastructure for Collaborative Enterprises, Apr. 17-19, 1994, 11 Pages.

Peng et al., "Point&Connect: Intention-based Device Pairing for Mobile Phone users", Proceedings of the 7th international conference on Mobile systems, applications, and services, Jun. 22-25, 2009, pp. 137-149.

Shim et al., "Providing Flexible Services for Managing Shared State in Collaborative Systems", Proceedings of the fifth conference on European Conference on Computer-Supported Cooperative Work, 1997, pp. 237-252.

"Understanding Home Sharing", Apple, Retrieved on Aug. 8, 2014, Webpage available at : http://support.apple.com/kb/HT3819.

"ITunes: How to Share Music and Video", Apple, Retrieved on Aug. 8, 2014, Webpage available at : http://support.apple.com/kb/HT2688.

"Touch Gesture Reference Guide", Retrieved on Aug. 8, 2014, Webpage available at : http://static.lukew.com/TouchGestureGuide.

Non-Final Office action received for corresponding U.S. Appl. No. 13/445,467, dated Oct. 17, 2013, 23 pages.

Final Office action received for corresponding U.S. Appl. No. 13/445,467, dated Apr. 17, 2014, 22 pages.

Schuckmann et al., "Modeling Collaboration Using Shared Objects", Proceedings of the international ACM SIGGROUP conference on Supporting group work, 1999, pp. 189-198.

Non-Final Office action received for corresponding U.S. Appl. No. 13/814,681, dated Nov. 5, 2014, 13 Pages.

International Search Report and Written Opinion received for corresponding Patent Cooperation Treaty Application No. PCT/US2012/071628, dated Feb. 22, 2013, 8 pages.

Ding et al., "Tracking Rdf Graph Provenance Using Rdf Molecules", Proceedings of the Fourth International Semantic Web Conference, 2005, 2 pages.

Milojicic et al., "Process Migration", Tech report from HP labs, HPL-1999-21, Dec. 5, 1998, 49 pages.

Rabin, "Efficient Dispersal of Information for Security, Load Balancing, and Fault Tolerance", Journal of the ACM, vol. 36, No. 2, Apr. 1989, pp. 335-348.

"Singularity", Microsoft Research, Retrieved on Jul. 17, 2015, Webpage available at : http://research.microsoft.com/en-us/projects/singularity/.

"K42", IBM Research, Retrieved on Jul. 17, 2015, Webpage available at : http://domino.research.ibm.com/comm/research_projects.nsf/pages/k42.index.html.

(56) References Cited

OTHER PUBLICATIONS

"Accelerating Innovation in the Desktop", Intel, Retrieved on Jul. 17, 2015, Webpage available at : http://download.intel.com/pressroom/kits/events/computex2009/Crooke_Computex_presentation.pdf.

"ARM11 MPCore™ Processor Technical Reference Manual Revision: r2p0", ARM DDI 0360F, Oct. 15, 2008, 728 Pages.

"ARM11MPCore Processor", ARM, Retrieved on Jul. 17, 2015, Webpage available at : http://www.arm.com/products/processors/classic/arm11/arm11-mpcore.php.

"Category Theory Lecture Notes", Laboratory for Foundations of Computer Science, Sep. 1996-Dec. 2001, 61 Pages.

Jaeger et al., "Flexible Control of Downloaded Executable Content", ACM Transactions on Information and System Security, vol. 2, No. 2, May 1999, pp. 177-228.

"Hyper-Threading Technology", Intel, Retrieved on Jul. 17, 2015, Webpage available at : http://www.intel.com/technology/platform-technology/hyper-threading/index.htm.

"OpenCL—The open standard for parallel programming of heterogeneous systems", Khronos Group, Retrieved on Jul. 28, 2015, Webpage available at : https://www.khronos.org/opencl/.

"The OpenMP® API specification for parallel programming", OpenMP, Retrieved on Jul. 17, 2015, Webpage available at : http://openmp.org/wp/openmp-specifications/.

Silberschatz et al.,"Interprocess Communication and Remote Procedure Calls", Operating system concepts, 6th edition, 2002, pp. 107-128.

Oliver et al., "Personal Semantic Web Through a Space Based Computing Environment", In Proceedings of Middleware for the Semantic Web, Seconds IEEE Interntional Conference on Semantic Computing, Aug. 4-7, 2008, 14 pages.

Patterson et al., "Recovery Oriented Computing (ROC): Motivation, Definition, Techniques, and Case Studies", Technical Report, UCB/CSD-02-1175, Mar. 15, 2002, pp. 1-16.

Hunt et al., "Singularity: Rethinking the Software Stack", ACM SIGOPS Operating Systems Review, vol. 41, No. 2, Apr. 2007, pp. 37-49.

"Recovery-Oriented Computing (ROC) Project", Berkeley, Retrieved on Jul. 17, 2015, Webpage available at : http://roc.cs.berkeley.edu/.

Pham et al., "The Design and Implementation of a First-Generation Cell Processor", IEEE International Solid-State Circuits Conference, Feb. 8, 2005, 3 Pages.

"L4 Developer's Bibliography", The L4 μ-Kernel Family, Retrieved on Jul. 17, 2015, Webpage available at : http://os.inf.tu-dresden.de/L4/bib.html.

Bozman et al., "Optimizing Hardware for X86 Server Virtualization", IDC Analyze the Future, Aug. 2009, pp. 1-18.

"Xen Architecture Overview", Slideshare, Retrieved on Jul. 28, 2015, Webpage available at : http://www.slideshare.net/nico200567/xen-architecture-q1-2008.

Hwang et al., "Xen On Arm: System Virtualization Using Xen Hypervisor for ARM-based Secure Mobile Phones", 5th IEEE Consumer Communications and Networking Conference, Jan. 10-12, 2008, pp. 257-261.

"XenServer", Citrix, Retrieved on Jul. 17, 2015, Webpage available at : http://www.citrix.com/English/ps2/products/product.asp?contentID=683148.

International Search Report and Written Opinion received for corresponding Patent Cooperation Treaty Application No. PCT/FI2011/050493, dated Sep. 28, 2011, 14 pages.

Melchior et al., "A Toolkit for Peer-To-Peer Distributed User Interfaces: Concepts, Implementation, and Applications", Proceedings of the 1st ACM SIGCHI symposium on Engineering interactive computing systems, Jul. 15-17, 2009, pp. 69-78.

Luyten et al., "Distributed User Interface Elements to Support Smart Interaction Spaces", 7th IEEE International Symposium on Multimedia, Dec. 12-14, 2005, 8 pages.

Bandelloni et al., "Flexible Interface Migration", Proceedings of the 9th international conference on Intelligent user interfaces, Jan. 13-16, 2004, pp. 148-155.

Demeure et al., "The 4C Reference Model for Distributed User Interfaces", Fourth International Conference on Autonomic and Autonomous Systems, Mar. 16-21, 2008, pp. 61-69.

Non-Final Office action received for corresponding U.S. Appl. No. 12/813,248, dated Feb. 7, 2012, 21 Pages.

Office action received for corresponding Chinese Patent Application No. 201180028581.4, dated Oct. 28, 2014, 6 pages of office action and no page of office action translation available.

Extended European Search Report received for corresponding European Patent Application No. 11791986.0, dated Nov. 25, 2014, 6 pages.

Office action received for corresponding Chinese Patent Application No. 201180028581.4, dated Apr. 9, 2015, 3 pages of office action and no page of office action translation available.

Extended European Search Report received for corresponding European Patent Application No. 12862981.3, dated May 6, 2015, 6 pages.

Notice of Allowance received for corresponding U.S. Appl. No. 13/445,467, dated Nov. 18, 2014, 8 pages.

Final Office action received for corresponding U.S. Appl. No. 13/814,681, dated Jun. 3, 2015, 22 pages.

Office action received for corresponding Japanese Patent Application No. 2014-549371, dated Jul. 2, 2015, 5 pages of office action and 6 pages of office action translation available.

Office action received for corresponding Japanese Patent Application No. 2014-549372, dated Jul. 17, 2015, 4 pages of office action and 4 pages of office action translation available.

Office action received for corresponding Korean Patent Application No. 2014-7021097, dated Jul. 20, 2015, 7 pages of office action and no pages of office action translation available.

Office action received for corresponding Chinese Patent Application No. 201180028581.4, dated Aug. 26, 2015, 3 pages of office action and no pages of office action translation available.

Non-Final Office action received for corresponding U.S. Appl. No. 13/814,681, dated Sep. 24, 2015, 12 pages.

Office action received for corresponding Russian Patent Application No. 2014128244, dated Oct. 6, 2015, 5 pages of office action and 3 pages of office action translation available.

Non-Final Office action received for corresponding U.S. Appl. No. 13/814,639, dated Oct. 7, 2015, 28 pages.

Office action received for corresponding Korean Patent Application No. 2014-7021088, dated Oct. 20, 2015, 5 pages of office action and no pages of office action translation available.

Extended European Search Report for European Application No. 12862981.3 dated May 6, 2015.

Extended European Search Report for European Application No. 11791986.0 dated Nov. 25, 2014.

Bandelloni, R. et al., *Flexible Interface Migration*, Proceedings of the Ninth International Conference on Intelligent User Interfaces (Jan. 2004) 9 pages.

Demeure, A. et al., *The 4C Reference Model for Distributed User Interfaces*, Proceedings of the Fourth International Conference on Autonomic and Autonomous Systems (Mar. 2008) 61-69.

Luyten, K. et al., *Distributed User Interface Elements to Support Smart Interaction Spaces*, Proceedings of the Seventh IEEE International Symposium on Multimedia (Dec. 2005) 8 pages.

Melchior, J. et al., *A Toolkit for Peer-to-Peer Distributed User Interfaces: Concepts, Implementation, and Applications*, Proceedings of the First ACM Sigchi Symposium on Engineering Interactive Computing Systems (Jul. 2009), 69-78.

Office Action for U.S. Appl. No. 13/814,639 dated Oct. 10, 2015.

Office Action for U.S. Appl. No. 13/814,681 dated Sep. 24, 2015.

Notice of Allowance for U.S. Appl. No. 13/445,467 dated Nov. 18, 2014.

Notice of Allowance for U.S. Appl. No. 13/814,681 dated Jun. 15, 2016.

Office Action for Japanese Application No. 2014-549372 dated Jan. 25, 2016.

Office Action for Korean Application No. 2014-7021097 dated Jan. 26, 2016.

Office Action for U.S. Appl. No. 13/814,639 dated Apr. 29, 2016.

Office Action for corresponding Chinese Application No. 201180076460.7 dated Mar. 31, 2016.

(56) References Cited

OTHER PUBLICATIONS

Office Action for corresponding Korean Application No. 10-2014-7021097 dated May 30, 2016.
Notice of Dismissal of Amendment for corresponding Korean Application No. 10-2014-7021097 dated May 30, 2016.
Ramos, G. et al.; "Synchronous Gestures in Multi-Display Environments"; In the Jour. of Human-Computer Interaction; vol. 24, Issue 1-2; pp. 117-169; Apr. 21, 2009.
Office Action for U.S. Appl. No. 13/814,639 dated Oct. 12, 2016.
Office Action for Chinese Patent Application No. 201180076462.6 dated Aug. 16, 2016.
Office Action for European Patent Application No. 11807948.2 dated Aug. 16, 2016.
Office Action from corresponding Chinese Patent Application No. 201180076460.7 dated Jan. 22, 2017.
Office Action and Search Report from corresponding Chinese Patent Application No. 2012800707774 dated Jan. 22, 2017 with English translation, 12 pages.
Office Action from U.S. Appl. No. 13/814,639 dated Feb. 24, 2017, 58 pages.
Office Action for Russian Patent Application No. 2014128242 dated Nov. 18, 2015.
Office Action for European Application No. 12 862 981.3 dated Nov. 4, 2016.
Lucero, A. et al., *Collaborative Use of Mobile Phones for Brainstorming*, MobileHCI'10 (Sep. 7-10, 2011), 337-340.
Lyons, K. et al., *Multi-Display Composition: Supporting Display Sharing for Collocated Mobile Devices*, Interact 2009, Part I, LNCS 4726 (2009) 758-771.
Office Action from corresponding Chinese Patent Application No. 201180076462.6 dated Jun. 2, 2017, 15 pages.
Office Action from U.S. Appl. No. 13/814,639 dated Jul. 13, 2017, 48 pages.
Office Action and Search Report from corresponding Chinese Patent Application No. 2011800764607 dated Jan. 10, 2018, with English summary, 14 pages.
Notice of Allowance for U.S. Appl. No. 13/814,639 dated Jan. 26, 2018, 28 pages.
Office Action and Search Report from corresponding Chinese Patent Application No. 2012800707774, dated Dec. 13, 2017, with English translation, 14 pages.
Office Action and Search Report from corresponding Chinese Patent Application No. 2011800764607 dated Jul. 3, 2018, with English summary, 6 pages.
Office Action and Search Report from corresponding Chinese Patent Application No. 2012800707774 dated Sep. 25, 2018, 11 pages.

* cited by examiner

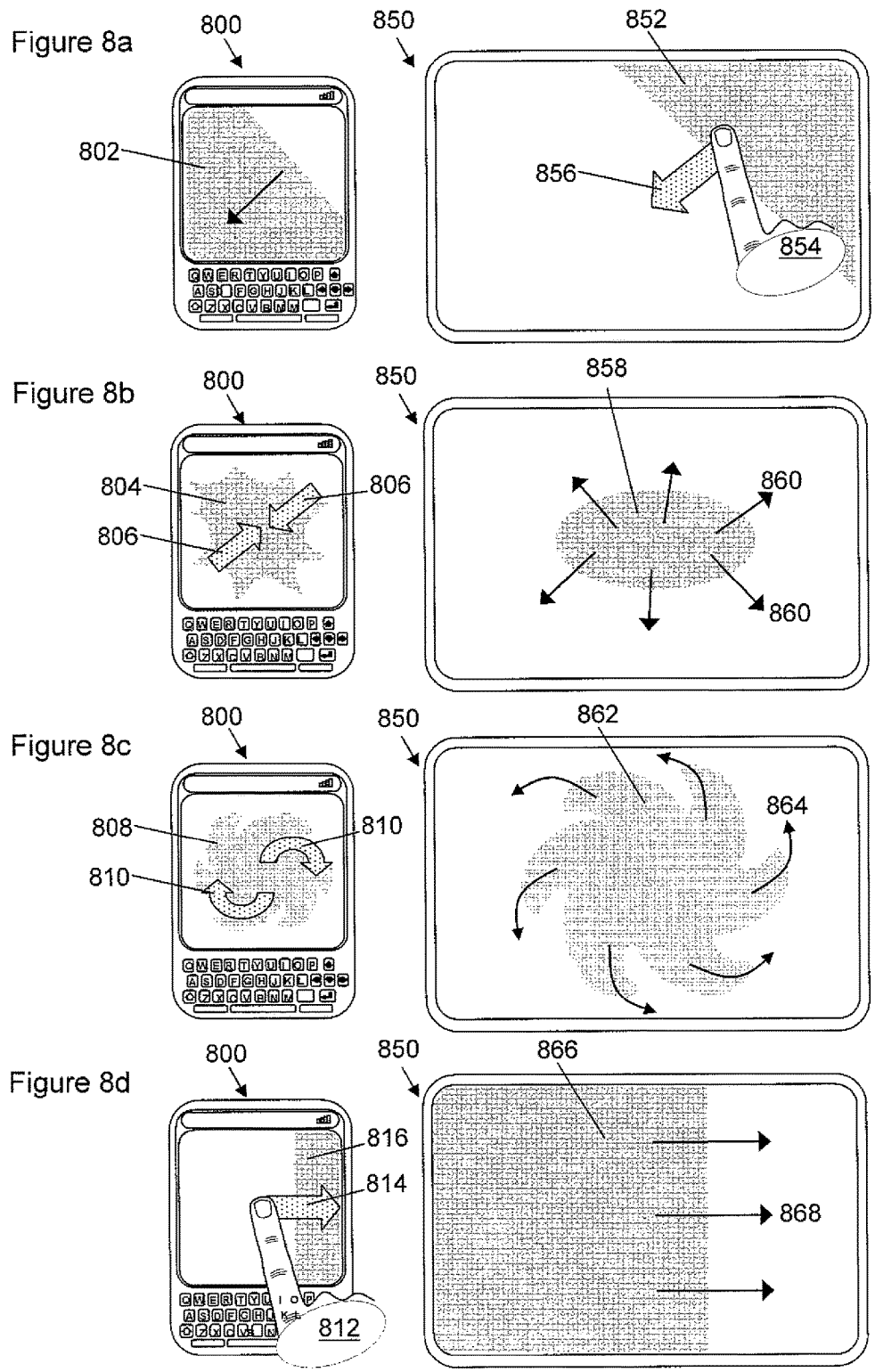

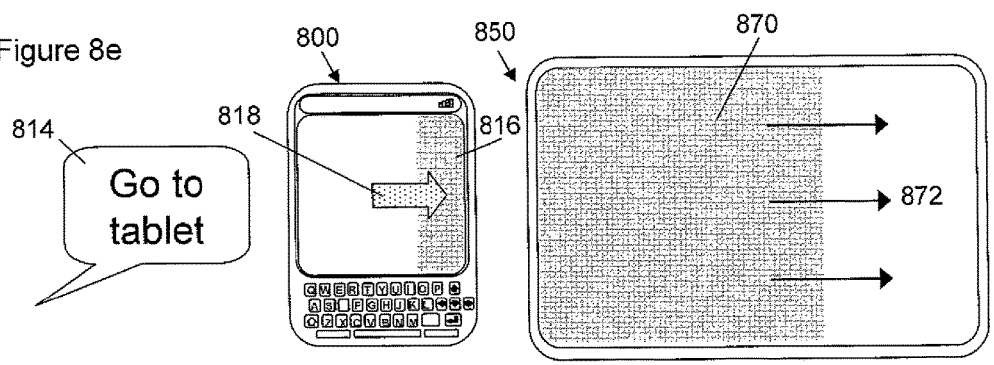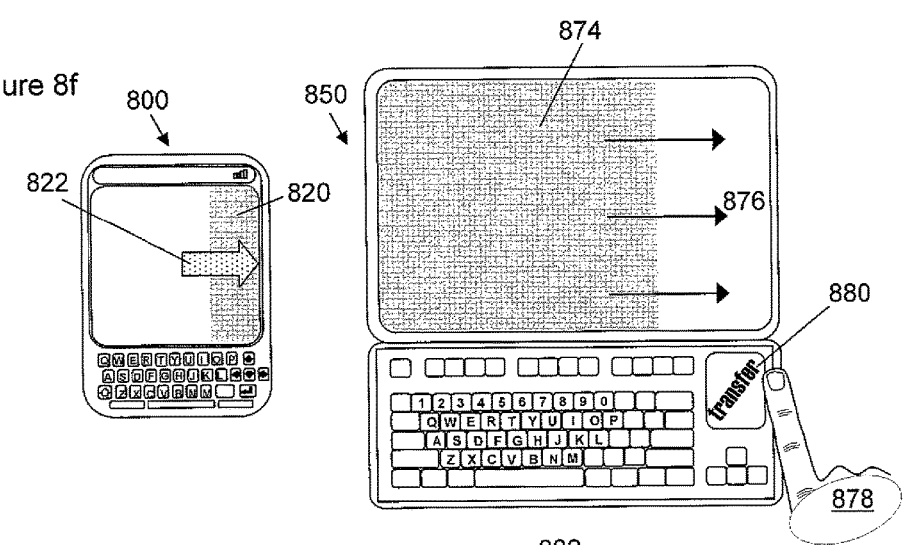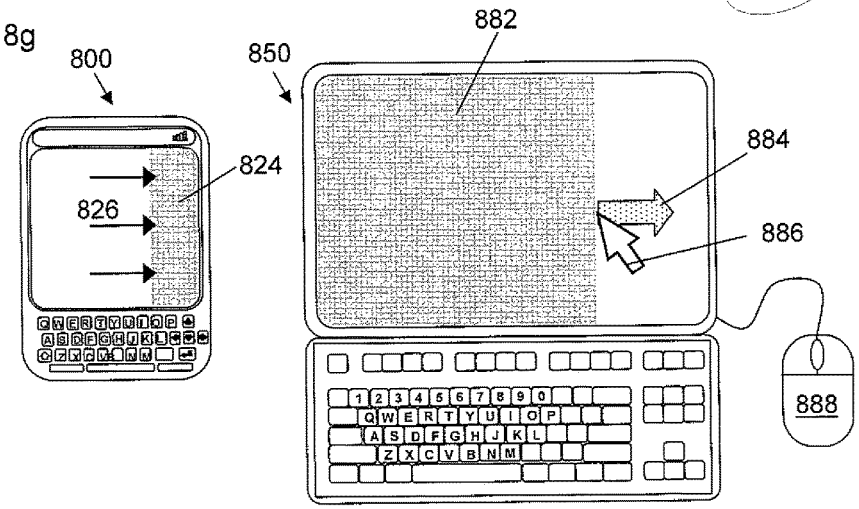

Figure 9
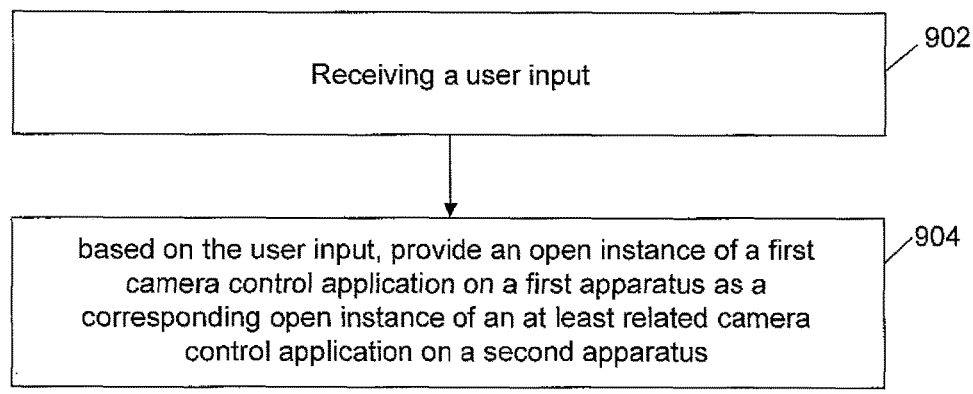
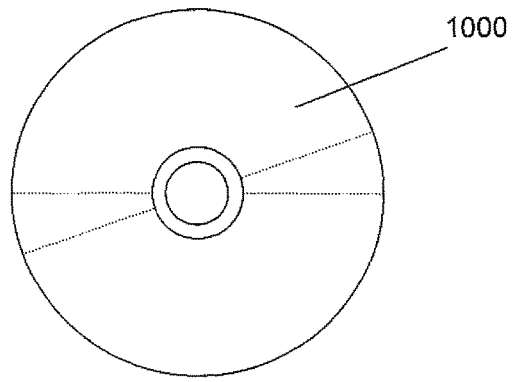
Figure 10

CAMERA CONTROL APPLICATION

RELATED APPLICATION

This application was originally filed as PCT Application No. PCT/US2012/071628 filed Dec. 26, 2012, claims priority to U.S. application Ser. No. 13/445,467, filed Apr. 12, 2012, which also claims priority to International Patent Application No. PCT/EP2011/074182, filed Dec. 28, 2011.

TECHNICAL FIELD

The present disclosure relates to the field of user interfaces, associated methods, computer programs and apparatus. Certain disclosed aspects/embodiments relate to portable electronic devices, for example so-called hand-portable electronic devices which may be hand-held in use (although they may be placed in a cradle in use) and which may include cameras. Such hand-portable electronic devices include so-called Personal Digital Assistants (PDAs), cameras, mobile phones, smartphones and tablet PCs.

BACKGROUND

Photography has long been popular, but has become particularly so now that digital cameras permit images to be captured and viewed without the time and cost needed to provide and process celluloid film.

Digital cameras can be manufactured cheaply and made small in size, and they are now included in many diverse types of electronic equipment, for example in mobile telephones, PDAs, personal computers, television sets (e.g. so-called 'smart TVs') and children's toys. However, not all electronic devices contain a camera, and even when a camera is present the specifications and therefore the images that can be captured vary hugely. For example, a high-end Digital Single Lens Reflex (DSLR) camera is typically very large, very heavy, and very expensive, whilst the small camera typically embedded into a mobile telephone is typically very small, very light and comparatively cheap to produce. However, the physical and functional limitations of the phone camera commonly result in it producing images that are highly inferior in quality to similar scenes captured by the DSLR camera.

SUMMARY

In a first example there is provided an apparatus comprising: at least one processor; and at least one memory including computer program code, the at least one memory and the computer program code configured to, with the at least one processor, cause the apparatus to perform at least the following: receive a user input; and based on the user input, provide an open instance of a first camera control application on a first apparatus as a corresponding open instance of an at least related camera control application on a second apparatus.

In a second example there is provided a method comprising: receiving a user input; and based on the user input, providing an open instance of a first camera control application on a first apparatus as a corresponding open instance of an at least related camera control application on a second apparatus.

In a third example there is provided a computer program configured to provide computer program code for at least the following: receiving a user input; and based on the user input, providing an open instance of a first camera control application on a first apparatus as a corresponding open instance of an at least related camera control application on a second apparatus.

In a fourth example there is provided an apparatus, the apparatus comprising: means for receiving a user input; and means for providing, based on the user input, an open instance of a first camera control application on a first apparatus as a corresponding open instance of an at least related camera control application on a second apparatus.

The above summary is intended to be merely exemplary and non-limiting.

BRIEF DESCRIPTION OF THE FIGURES

A description is now given, by way of example only, with reference to the accompanying drawings, in which:

FIGS. 8a-8g illustrate different examples of ways in which an open instance of an application may move from one apparatus/device to another apparatus/device;
FIG. 9 illustrates a flowchart according to an example method;
and
FIG. 10 illustrates schematically an example computer readable medium providing a program.

DETAILED DESCRIPTION OF EXAMPLES

Figure 1:
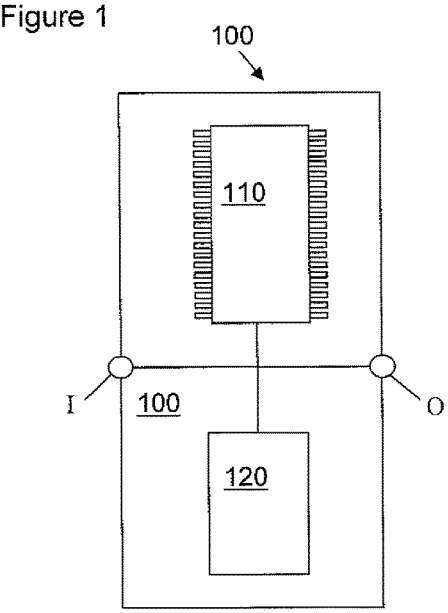
FIG. 1 illustrates an example apparatus.

Electronic apparatuses/devices are often configured to run one or more applications. The same application may be run on different apparatus, possibly at the same time. For example, an office may contain several desktop computers which may all run the same word processing application at the same time. The application may be stored on a remote server and accessed by the different apparatus/devices, or the application may be locally stored for use on each individual desktop computer.

In another case, there may be equivalent applications which have substantially the same functionality, and which may also run on different apparatus/devices. Such equivalent applications may, for example, be the word processing applications Microsoft Word, WordPerfect, and Open Office Writer. These three applications can be considered to be equivalent in the sense that they provide a user with substantially the same functionality, but they are in fact different word processing applications.

Further, other applications may share some common functionality while each also having functionality not in common with another application. For example, a spreadsheet application and a data plotting application may be considered to share common functionality. These two applications share some common functionality (for example, being able to organise data in a tabular/cellular format) but each may have their own functionality which is not shared. For example, the spreadsheet application may allow more advanced text-based reports to be generated and the data plotting application may not allow this functionality, but the data plotting application may allow a user to plot data in a more advanced way, for example using mathematical functions and statistical analysis, but the spreadsheet application may not allow this functionality.

One example of an application that may be run on a on an apparatus/device is a camera application that is used to control a physical camera. Such control may include causing the camera to capture an image, changing the camera's settings (for example its focus, aperture, ISO (i.e. film speed), etc. Where the camera is movable (for example where it is mounted on servos) then the control may include moving the camera. The camera control application may also, or alternatively, cause information to be presented to the user concerning the camera's current state: for example a viewfinder view, or one or more current settings of the camera.

In the case where the application is a camera control application, there may be circumstances in which it is desirable that it is run on a particular apparatus. For example, it may be beneficial to run the application on an apparatus that comprises the camera itself. Not only does this simplify the relationship between the application and the camera in the user's mind (he is controlling the camera locally), but since the image captured by the camera will normally be dependent upon its position (and therefore the position, in this example, of the apparatus comprising the camera), the user can easily access a user interface presented by the camera control application whilst he is holding the camera in order to appropriately position it.

Conversely, it may sometimes be beneficial that the camera control application runs on a device other than the camera.

An example of a use case in which it may be desirable to run the camera control application on a device other than the camera being controlled is when the user is for some reason unable to immediately access the camera. For example, the user may be composing a photograph in which he is the subject (or one of the subjects)—in this event it would be beneficial for the user to control the camera whilst he is in the correct position for the photograph to be composed (e.g. when he is some distance in front of the camera and probably unable to reach the camera or to easily see its user interface). Alternatively, the user may not be a subject of the composition, but for other reasons may not be able to reach his camera. Examples of this latter scenario would be where the camera has been out of reach of the user in order to capture a better view of a scene (for example when it is mounted on a camera rig and raised too high for the user to reach), or where the camera has been introduced into an environment that is unsafe or undesirable for the user to enter (e.g. underwater, in proximity to a dangerous or easily scared animal, or close to a poisonous or otherwise dangerous object).

Another example use case in which it may be desirable to run the camera control application on a device other than the camera is when the user may have ready access to the camera but prefer not to directly interact with it. For example, the user may wish to avoid disturbing the camera by touching it to instruct it to capture an image (e.g. by depressing a shutter button) because the vibration that he introduces to the camera when touching it may adversely affect the quality of the captured image.

As another example, the user may simply prefer the user interface offered by a device other than the camera. For example, the user may prefer to view the camera's viewfinder view on a device that has a larger or otherwise preferable display than that of the camera, or he may prefer to interact with the camera using a device that has controls that are more accurate or more ergonomic than those provided by the camera, or that are simply not provided by the camera. As an example of the latter case, where the camera is configured to be movable the user may wish to pan the camera back and forth smoothly—a device providing an analogue joystick or other control well suited for this purpose may enable the user to achieve a smoother pan than the controls present on the camera itself (digital push buttons, for example).

It may also provide a benefit to a user of multiple devices if there was a relatively easy and intuitive way to transfer an open instance of an application (which can perform at least one task) such as a camera application from one device/application to another device/application. For instance, closing the first application on the first device, and then manually opening a second, equivalent, application on a second device, may be considered to be cumbersome for a user. If the user were able to, for example, perform a gesture on the touch sensitive screen of one device to transfer the open instance of the application to the second device and then recommence working on the same task/application in the second application/device, then the user may experience a smoother and simpler way of transferring tasks performed using applications between devices.

FIG. 1 shows an apparatus 100 comprising a processor 110, memory 120, input I and output O. In this example embodiment only one processor and one memory are shown but it will be appreciated that other embodiments may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling to the apparatus 100 from further components. The output O allows for onward provision of signalling from the apparatus 100 to further components. In this example embodiment the input I and output O may be part of a connection bus that allows for connection of the apparatus 100 to further components. The processor 110 may be a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this example embodiment the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other example embodiments, one or more or all of the components may be located separately (for example, throughout a portable electronic device such as devices 200, 300, or through a "cloud", and/or may provide/support other functionality.

Figure 2:
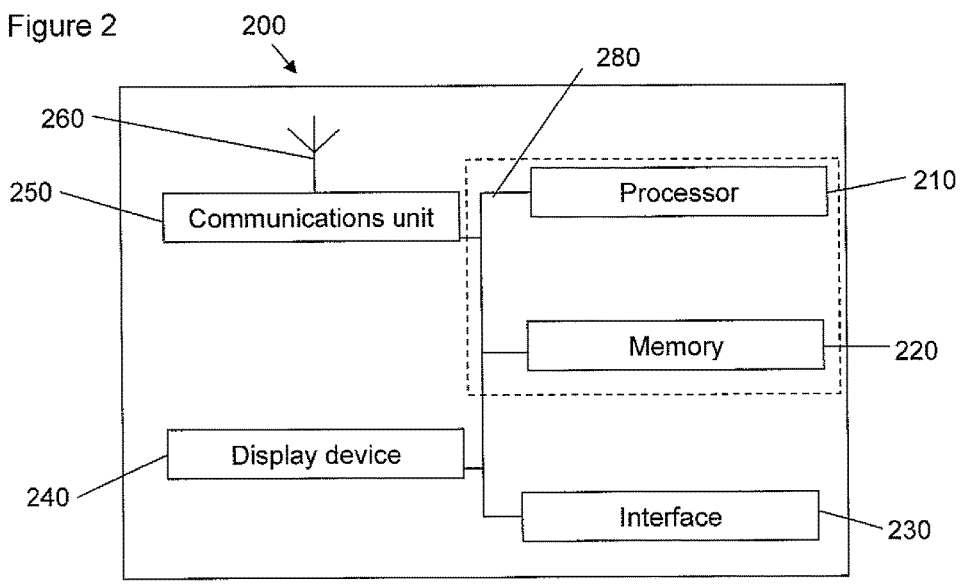
FIG. 2 illustrates another example apparatus.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as, a Liquid Crystal Display (LCD), e-Ink, or touch-screen user interface. The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Figure 3:
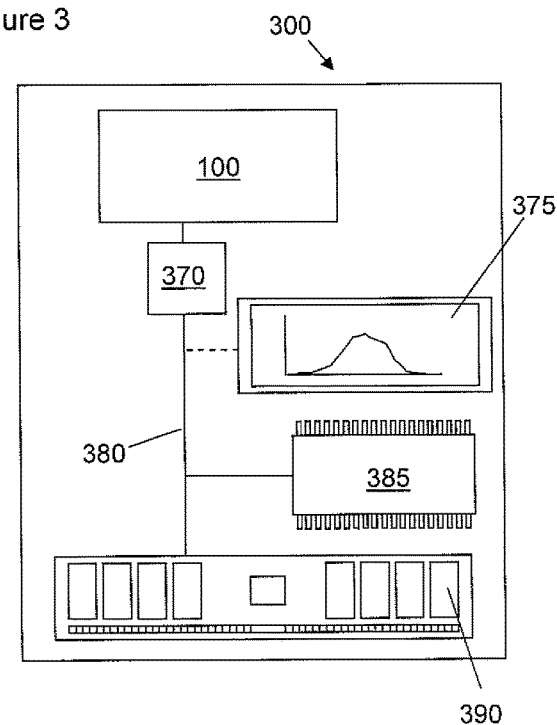
FIG. 3 illustrates a further example apparatus.

Device/apparatus 300 shown in FIG. 3 may be an electronic device (including a tablet personal computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 380 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types.

Figure 4:
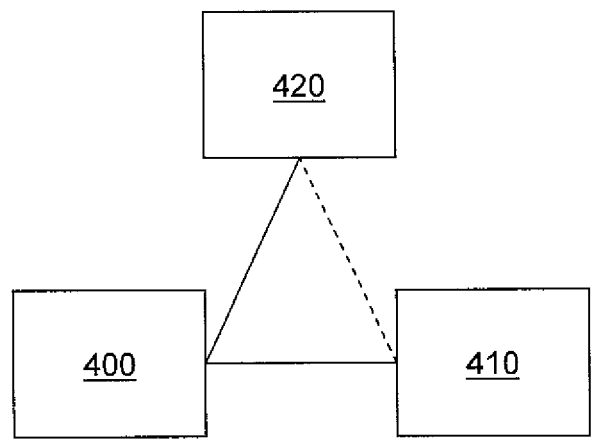
FIG. 4 illustrates an example arrangement of apparatuses.

FIG. 4 illustrates an arrangement of two apparatuses 400, 410 according to example embodiments. The apparatuses 400, 410 are in communication with one another as shown by the solid line between them. A first one of the apparatuses 400 is in communication with a camera 420 as illustrated by the solid line between them. In some embodiments the second of the apparatuses 410 may also be in communication with the camera device, but in other embodiments it may not be—the line drawn between the second apparatus 410 and the camera 420 is therefore drawn dashed. Where the second apparatus 410 is not in communication directly with the camera 420, it may still be able to send and/or receive data to/from the camera 420 via the first device 400. The communication between the apparatuses 400, 410 themselves and with the camera 420 may be effected over any suitable means. For example, the communication may be effected over a direct cable connection (e.g. Universal Serial Bus, USB) with suitable interfaces. Alternatively, the connection may be wireless, for example over Bluetooth, WiFi, or any other suitable wireless communication. The connections may be direct point-to-point, as shown in FIG. 4, or they may be made indirectly, for example over the Internet or through a different network. The communications may be effected using WebRTC (Web Real Time Communication).

Each of the apparatuses 400, 410, 420 is capable of running at least one application that controls the camera 420. These applications may be identical copies of the same application, or they may be different applications that have at least some camera control functionality in common between them. Each of the apparatuses 400, 410, 420 may be running an operating system that is the same or different to the operating systems of the other apparatuses, and an equivalent application could be run on each device in either case.

Camera control applications may be considered "at least related" to each other on the basis that they are either equivalent (i.e. they provide substantially similar functionality), or identical. The two applications may be identical in the sense that they are different instances of the same application, or may be identical in the sense that they are the same instance of an application, with that single instance being transferable between apparatuses.

Consider a further example. In this example apparatuses 400 and 410 can each access and run a different camera control application. The camera control application runnable by apparatus 400 includes functions for displaying a viewfinder view of the camera, causing the camera 420 to capture an image, and switching the camera flash on and off. The camera control application runnable by apparatus 410 includes equivalent functions for displaying a viewfinder view and causing the camera 420 to capture an image, but it does not include a function for switching the flash on and off. Apparatus 400 is in this case capable of running an application with a common level of functionality to that provided by the application runnable on the apparatus 410. The common level of functionality in this example is that a viewfinder view may be presented and the camera may be caused to capture an image. The common functionality may also be considered to be any menu options 408, 468 with the same common functionality. For example, the application 462 may also allow for the functionality to change camera settings. The user interface may be different for the two applications without affecting the fact that they provide a common level of underlying camera control functionality and therefore provide substantially similar functionality making them equivalent. It will be appreciated that there are many other ways in which the appearance may be different between two open instances of two applications, such as having different colour schemes, different fonts, different display sizes and form factors, different style buttons/icons/menu systems, and many other possible factors.

The apparatuses 400 and 410 in FIG. 4 may be independently operable; that is, they can be used as standalone devices without connection to another device, such as a server, and provide the functionality of their camera control applications. However, they may instead be communication with an external remote server. Any number of apparatuses may be in communication with the remote server, which may be either a cloud or a physical server. The communication with the remote server may be a two way communication for each apparatus 400, 410, 420. Each apparatus 400, 410, 420 may be capable of running one or more applications.

Where a remote server is present, related camera control applications may be provided for use on various different apparatuses by communication with the remote server. That is, a camera control application may be available from the server, and different versions of this application may be available, each version being more suited for use on a particular apparatus. For example, a version with a relatively large functionality may be suitable for use on a laptop or desktop computer, a version with reduced functionality may be suitable for use on a mobile phone or smartphone, and a version with particular functionality suitable for use on a digital camera may also be available.

As another example, the same camera control application may be provided for use on various different apparatuses by communication with the remote server. Thus, applications are not necessarily located locally just on the apparatuses that will run them, but may need to communicate with the remote server in order to run the application. In certain embodiments, the application can be considered to be distributed between the apparatus and the server, with parts of the application on the respective device/server needing to be run together to perform the tasks provided by the application.

The server may provide, for example, the same, or related applications, for use by allowing for download of the application from the server, so that after the download, the apparatus can run the stored application as a stand-alone device, without further communication with the server. The apparatus may also be able to communicate further with the server, for example to download and store an updated version of the application. Provided for use may also be taken to mean that the application is stored and running on the remote server, and that the apparatuses provided with that application for use are using that application which is running on the server. In this case, a user of the device may not be able to use the application if communication with the server is interrupted or terminated. In other examples, there may be more than one remote server, with which one or more devices is/are in communication. To say that an application is "running" on an apparatus may therefore mean that it is running on a remote server but accessible to the apparatus.

Figure 5:
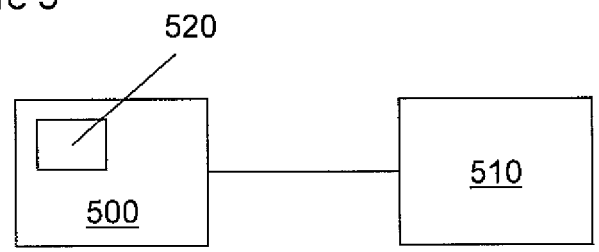
FIG. 5 illustrates a further example arrangement of apparatuses.

FIG. 5 illustrates a different arrangement of two apparatuses 500, 510 that is similar to that of FIG. 4 except that the camera 520 forms part of the first apparatus 500. The first 500 and second 510 apparatuses are again in communication with one another.

FIGS. 6a-6d illustrate an example embodiment of three apparatuses: a portable electronic device such as a tablet computer 600, a mobile telephone 610 and a digital camera 620. These three apparatuses have been chosen merely by way of example—apparatuses 600 and 610 may be any suitable apparatus capable of running applications, and apparatus 620 may be any suitable apparatus that either comprises a camera or is in communication with a camera such that it can control the camera. "Controlling" the camera may comprise sending data to the camera that causes the camera to perform a function (such as capture a static image or video, move the camera, or change a camera setting) and/or receive data from the camera (such as a viewfinder view, captured static image or video data, or data representing the camera's current settings).

In this example, all three apparatuses 600, 610, 620 are in communication with one another (for example they are all attached to a common network). Not all three apparatuses need be present or even exist, for example only apparatuses 600 and 620 might be present in the absence of apparatus 610. Similarly, other apparatus (not illustrated) may be present and also in communication with the apparatuses shown.

Figure 6A:
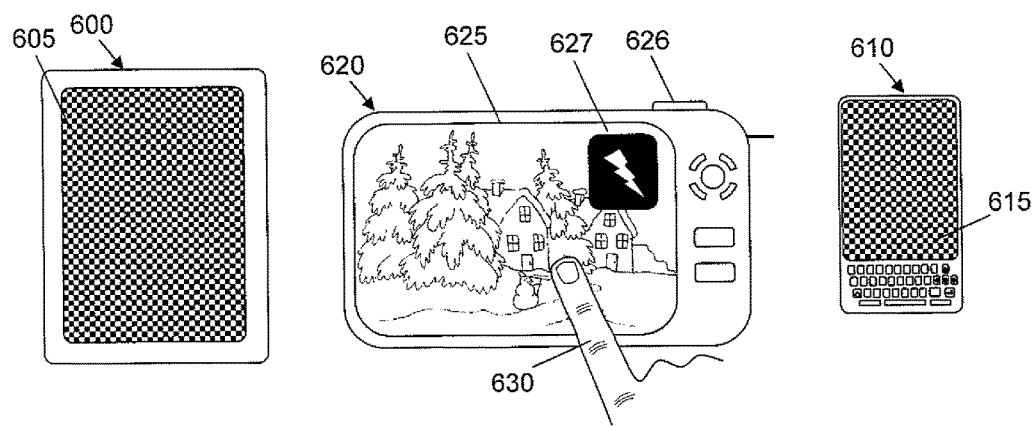
FIGS. 6a-6d illustrate an example in which an open instance of a camera control application being moved across three different apparatus/devices.

In FIG. 6a the digital camera 620 comprises a display 625 and a shutter button 626. The camera 620 is currently pointed towards a snow scene which is displayed in a viewfinder view on the camera's display 625. Were the user to now press the shutter button 626, an image or video of the snow scene would be captured by the camera 620, in according with the current settings of the camera.

There may be transient data associated with the camera control application running on the camera 620. For example, the current zoom level, the current flash settings, the current position/status of navigation through a menu system provided by the camera control application. Were the camera control application on the camera 620 to be closed (e.g. by turning the camera off, or by otherwise exiting the application) then such data would not be preserved until the application was next loaded and can therefore be considered to be transient content. Transient content may be thought of as data which is not normally saved upon an application being closed, that is, transient content would not normally persist between instances of an application being opened. In contrast, the data that would persist (e.g. images that have been captured and stored to the camera's memory) can be considered to be data content as (opposed to transient content).

In the example shown in FIG. 6a, the user has chosen a digital zoom setting that influences how the image (when captured) will be cropped, and also dictates the area of the currently sensed image that is displayed in the viewfinder view. The user has also selected to activate the flash and an indication 607 of this setting is shown overlaying the viewfinder view.

The interface displayed by the camera's 620 camera control application may also show other features such as previously captured images. These images form data content. Data content may be considered persistent, in that it will always be available to a user upon the user opening the camera control application. The camera control application itself may also display elements such as menus and buttons/icons and such elements would not be considered to be data content. Each time the camera control application is opened, the images, menus, buttons and text will be presented and/or available to the user regardless of any transient content such as the current view through the viewfinder or non-persistent settings. Also, different camera control applications may have different menus and/or buttons/icons and may still allow the user to view the same data content, e.g. the same previously captured images.

Other examples of data content include text (such as text saved in a word processing document, e-mail, database, text-based message or contacts list); numbers (such as entries made in a spreadsheet, database or data package, or contacts list); fields (such as entries made in a database, text entered into a field in a website); cells (such as spreadsheet entries); image content (such a photographs, maps, drawings, presentation slide content, and images in games); audio content (such as music, songs, voice recordings and game soundtracks); video content (such as video cuts in games, and movies); and webpage content (text, images and hyperlinks). It will be appreciated that this list of examples is not exhaustive. It will also be appreciated that, upon opening a previously closed application, such data content is usually presented and/or available to the user.

In the example shown in FIG. 6*a*, the flash setting and digital zoom level are transient content.

At this point the tablet 600 and mobile phone 610 do not necessarily show any open applications on their respective displays 605, 615. It may be that there is camera control application currently running on these devices. Alternatively, there may be a camera control application running, but it is 'minimised' or hidden so that although it is running, it is not currently displayed. Each of the displays 605, 615 may be deactivated, or may be displaying content such as for example a screensaver or homepage. However, each of apparatuses 600 and 610 have access to and can run camera control applications that are at least related to the camera control application of apparatuses 620, in that they may be the same application (for example, all three apparatuses 600, 610, 620 may have the same camera control application) or they may have camera control applications with a common level of functionality (for example, the camera control application of apparatus 600 may be one particular camera control application, whereas device 610 may have a different camera control application and apparatus 620 may have a plurality of other camera control applications. These applications all have a common level of functionality.)

In this example, the camera control applications are provided for use on apparatuses 600, 610, 620 by accessing respective memories located with each apparatus. For example, a first camera control application is located in a memory (not shown) of the tablet 600, a second camera control application is located in a memory (not shown) of the phone 610, and a third camera control application is located in a memory (not shown) of the camera 620.

Figure 6B:
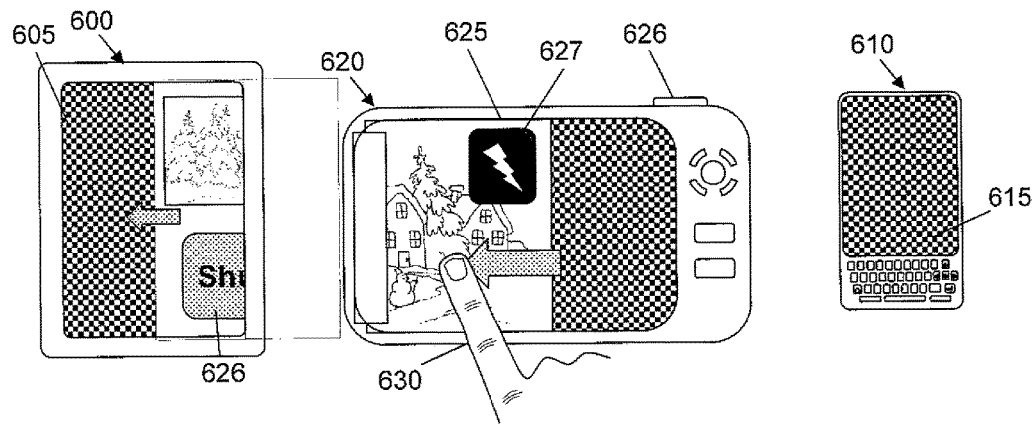
Figure 6C:
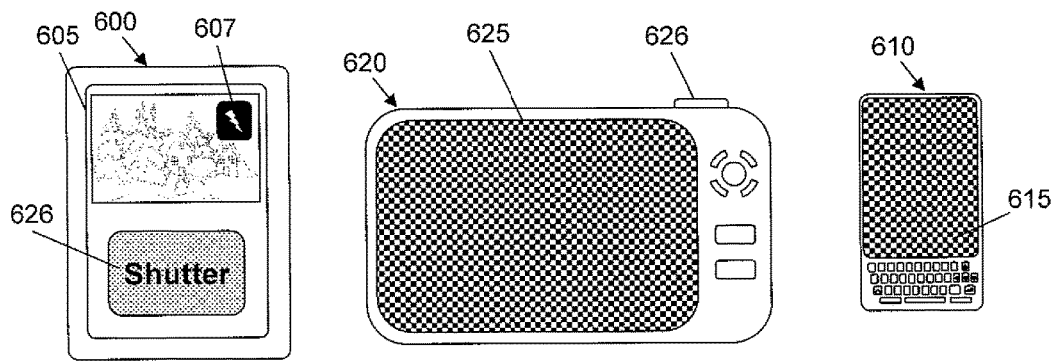

FIG. 6*b* illustrates the user's finger 630 part way through a left slide operation. In response to the left swipe operation, the UI of the camera control application on the camera 620 has been translated to the left of the camera's display 625 and is shown having partially exited the display on the left hand side. Substantially simultaneously, the UI of the camera control application of the tablet is shown entering the tablet's display 605 from the right hand side.

In FIG. 6*b*, a user 630 is providing a user input which is being received by the second device. In this example the user is providing a slide gesture to the touch-sensitive screen of the computer 630. Other user inputs may be used in place of the slide gesture, and some examples of suitable user inputs will later be described in more detail.

Based on this user input, as shown in FIG. 6*b*, the open instance of the camera control application of the camera 620 is provided as a corresponding open instance of an at least related (camera control) application on the tablet 600. That is, due to the user input, the camera control application which was open on the camera 600 now appears as an open instance of the camera control application on the tablet's display 605. In this example, the same data content and the same transient content (e.g. digital zoom level and flash setting 607) are provided on the tablet 600 as were provided in the camera control application on the camera 620.

In this example shown in FIG. 6*b*, the open instance of the camera's camera control application is progressively removed from the display 605 of the camera 620, and the corresponding open instance of the (at least related) camera control application is progressively displayed on the tablet 600 as the user moves his/her finger progressively from the right to the left. The progressive removal/display occurs in this example in the direction of the user input; that is, the user is sliding his finger 634 from right to left and the apparent transition of the open instance of the application from the camera 620 on the right to the tablet 600 on the left is in the same direction, right to left. The term "apparent transition" is used because, in this example, the open instance of the first application is not actually moved from the first to the second apparatus. The transient content and the data content are synchronised between the two apparatuses 600, 620, and the open instance of the camera control application on the tablet 600 is configured to use the transient content and data content to display an application to the user which shows common features to that seen on the camera 620 before the user input. In this example, it may be considered that the local state (including the transient content and the data content) is replicated on the tablet 600 as in the camera 620, giving the appearance that the open instance of the camera's camera control application has been transferred as the open instance of the tablet's camera control application.

It can also be seen that the difference in form factor is accounted for in this example. The form factor of the displays of the camera 620 and tablet 600 are different, and so the form factor of the displayed content is altered accordingly so that the open instance of the camera control application displayed on the camera 620 displays the same viewfinder view as the open instance of the camera control application displayed on the tablet 600. Note also that in this example the tablet lacks a physical shutter key like that 626 present on the camera 620. The UI of the camera control application on the tablet 600 therefore includes a virtual shutter button 606 that was not present in the UI of the camera control application on the camera 620.

It will be appreciated that in other examples, the form factor of the displayed open application may not be preserved upon displaying another open instance of a user application, and the form factor may be chosen to best suit the data being displayed. For example, video shown in widescreen display on a landscape-oriented monitor of a laptop may maintain the form factor of the widescreen if subsequently opened on a mobile telephone with a portrait-oriented screen; the other regions of the mobile phone screen not showing the video may be black or contain other options or text. Rotating the mobile phone so that the display is landscape oriented may cause the movie to be rotated correspondingly and displayed in landscape on the landscape oriented display of the mobile phone.

The two apparatuses 600 and 620 not only have different form factors, but also have different display sizes. The open instance of the second application on the second apparatus is resized in comparison with the open instance of the first application on the first apparatus, to accommodate the larger screen of the second apparatus with respect to the first apparatus. The two apparatuses 600, 630, may also have different display resolutions and/or different display colour schemes (for example, one apparatus may have a black and white screen, and another apparatus may have a colour screen).

The apparent transition of the camera control application being progressively removed from display from the camera 620 and progressively displayed on the tablet 620 may be dependent on a speed-dependent characteristic of the user input, it may be envisaged that if the user makes a faster slide gesture, that the apparent transition would be relatively faster. Similarly, if the user were to make a relatively slow slide gesture, then the apparent transition may be relatively slower. Also, for example, the user may be able to begin to make a slide gesture, then (say, if they changed their mind about wanting to make the transition) they could reverse their input and move the open instance of the application back on to the original apparatus.

Figure 6D:
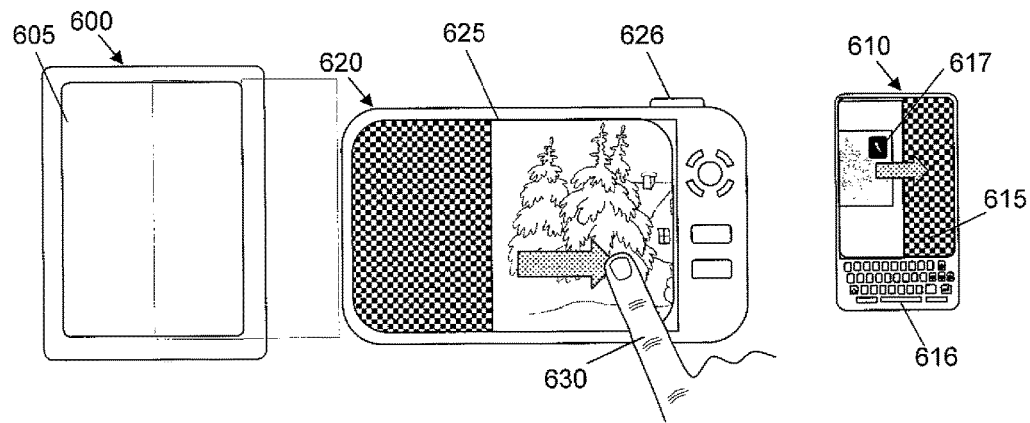

The provision of open instances of user applications is not limited to being between two apparatuses only. FIG. 6d shows an alternative to FIG. 6b in which the user 630 is providing a user input on the camera 620 that is a left to right slide gesture rather than the right to left slide gesture of FIG. 6b. In response, the camera control application is transitioned not to the left to the tablet 600, but instead to the right to the mobile phone 610. Note that a physical button on the mobile phone 600 has been repurposed as a shutter key 616, so a virtual shutter key like that 606 of the tablet's 600 is not required. Again in this example, the same data content and the same transient content are provided on the mobile phone as were provided in the camera 620 (and indeed the tablet 600). Therefore, the user need not zoom in again, or re-set the flash mode (note the flash indicator 617 in the UI of the phone's 610 camera control application as this transient content has been preserved during the transition.

In the example embodiment shown in FIGS. 6a-6d, when the camera control application is transitioned to a new apparatus, it ceases to be displayed on the old apparatus. However, in other examples the open instance of the camera control application remains displayed on the old apparatus after the corresponding open instance of the camera control application new apparatus. This remaining display may be as an image, to remind the user what has been displayed on the old apparatus but which does not allow full interaction as previously. In other examples, the remaining display may be the camera control application for that apparatus which is still running and with which the user may still be able to fully interact. It will be appreciated that the application on the old apparatus may close after the apparent transfer to the new apparatus. Of course, it may instead remain open and be updated, synchronised with changes made on the apparatus with which the user is interacting.

For example, it may be envisaged that while the user can make inputs and manipulate the open camera control application on the phone 610, he or she may also be able to make inputs and manipulate the open application on the camera 620. Just because the open instance has been provided on a further apparatus does not necessarily exclude the ability of the open application to still be running on the initial apparatus. Any inputs made on the new apparatus may be received by the open instance of the camera control application on the old; however, on-going synchronisation of the transient content of the applications on the apparatuses may mean that the effect of such inputs at the old apparatus is propagated into the application running on the new apparatus. In such cases one of the apparatuses, or a remote server, can act as a controller to control the synchronisation between the multiple apparatuses, or more than one of the apparatuses can act in cooperation to control the synchronisation.

In the above example, the gestures can be considered to be push gestures, in that the corresponding open instance is seen to be pushed onto a new apparatus from the apparatus which receives the gesture input. Of course, in other examples, the (gesture) input could be a pull gesture input from a new apparatus to cause the corresponding open instance to be provided to the new apparatus from an old apparatus on which it is currently running.

It may be the case that two apparatuses are configured to form a (e.g. private) sharing network to allow for the provision of corresponding open instances of an at least related application as described herein.

Figure 7A:
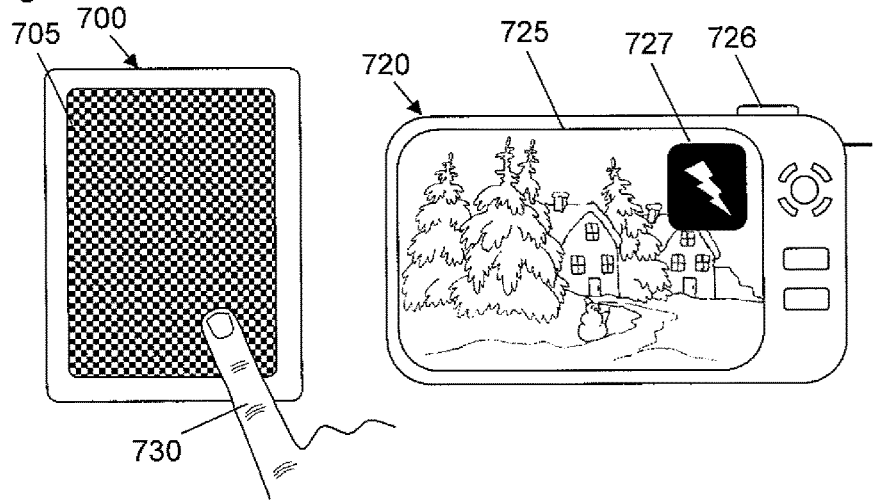
FIGS. 7a-7c illustrate another example in which open instance of a camera control application being moved across two different apparatus/devices.
Figure 7B:
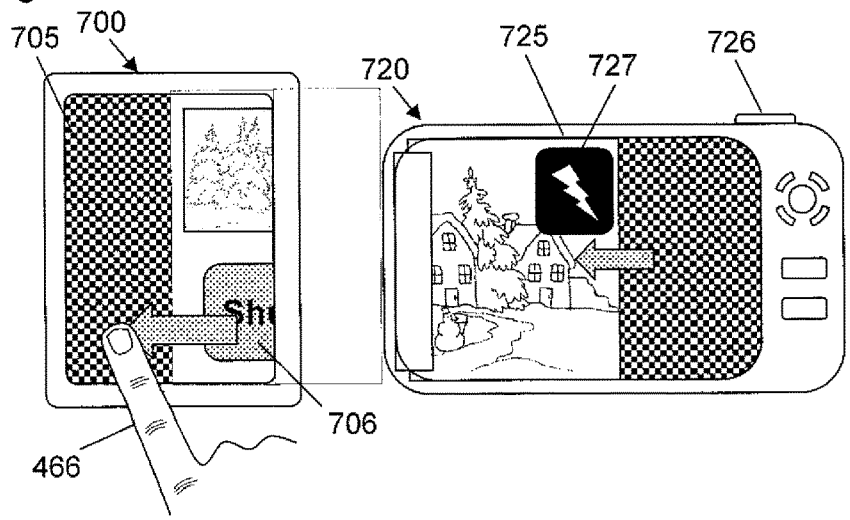
Figure 7C:
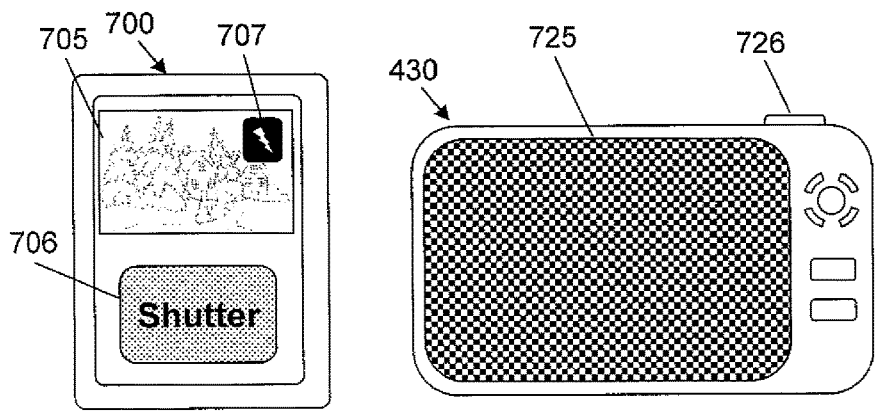

FIGS. 7a-7c illustrate another example embodiment of two apparatuses in use: a tablet 700 and a camera 720. The apparatuses 700, 720 in are each able to run a camera control application, and may (otherwise) operate independently, that is, each may not require any connection to another apparatus or to the internet or other network in order to operate (although such connections to other apparatuses and/or to a network and/or the internet may be possible, and required to allow for the corresponding open instances of a related application). The two apparatuses 700, 720 may also each be able to run a plurality of applications each providing respective functionalities. For example, the apparatus 700 may have calling capabilities, be able to send/receive SMS, MMS and video messages, send/receive e-mails, play games, and access social media sites and applications. The apparatus 720 may be able to run productivity applications (word processing, spreadsheets, databases, presentation applications) and image processing applications, and play games—the fact that it is a camera does not preclude such additional functionality.

FIG. 7a shows the camera 720 displaying an open instance of a camera control application on its display 725. In FIG. 7a, the user has set the digital zoom to a particular level and has activated the flash, as indicated by the flash indicator 727 that is displayed overlaying the viewfinder view in the camera control application's UI on the display 725. The camera 720 comprises a dedicated shutter button.

As previously described in relation to FIGS. 6a-6d, the open instance of the camera control application contains the transient content of the digital zoom level and current flash setting. The user may decide that he wishes to compose and capture a photo remotely from the camera, for example because he wishes to be present in it. To this end, he may decide to compose and capture the image using his tablet 700 to control the camera 720. FIG. 7a shows that there are no open instances of any application displayed on the tablet. However, as previously described in relation to FIGS. 6a-6d, this does not preclude other examples in which applications and/or other content may be displayed on the tablet's display 705.

The tablet 700 has access to and can run a camera control application that is at least related to that running on the camera 720, in that they may be the same application (for example, both apparatuses 700, 720 may have access to the same camera control application) or they may have camera control applications with a common level of functionality (as described previously). It may be imagined that an apparatus such as tablet 700 may have more than one suitable camera control application available for use. All these applications will have a common level of functionality in that they can be used for controlling camera 720. In this example, the camera control applications are provided for use on apparatuses 700, 720 by accessing the respective memories located in each apparatus. It may be in other examples that one or more apparatus accesses the required software from a remote server or cloud as has previously been described.

In FIG. 7b, a user 730 is providing a user input which is being received by the tablet 700. In this example the user is providing a slide gesture to the touch-sensitive display 705 of the tablet 700. Other user inputs may be used in place of the slide gesture, and some examples of suitable user inputs are described later in more detail.

Based on this user input, as shown in FIGS. 7b and 7c, the open instance of the camera control application running of the camera 720 is provided as a corresponding open instance of an at least related (camera control) application on the tablet 700. Due to the user input, the data content and transient content in the camera control application which was open on the camera 720 now appears in an open instance of the camera control application on the tablet 700. The same data content and the same transient content (e.g. the digital zoom level and the camera flash indicator 727) are provided on the tablet 700 as were provided in the camera control application running on the camera 720.

FIG. 7c shows that the digital zoom level and the camera flash setting (shown by indicator 707) have been preserved after the camera control application has been apparently so translated to the tablet 700. Thus, the user need not be concerned with re-establishing these settings.

In this example shown in FIG. 7b, the open instance of the camera control application running on the camera 720 is progressively removed from the display 725 of the camera 720, and the corresponding instance of the camera control application running on the tablet 700 is progressively displayed on the tablet's display 705. The progressive removal/display occurs in the direction of the user input; that is, the user is sliding his finger from right to left and the apparent transition of the open instance of the camera control application from camera 720 on the right to the tablet 700 to the left is in the same direction, right to left. Of course, the gesture input may be provided on the tablet 700 by pressing a particular key, or by using the display if it allows for touch input.

In the example illustrated in FIGS. 7a-7c the user has caused a corresponding instance of the application running on the camera 720 to be displayed on the tablet 700 using a gesture that is performed on the tablet 700 (a "pull" gesture, in the sense that the instance of the application is "pulled" to the apparatus that receives the gesture). This is in contrast to the example illustrated in FIGS. 6a-6c in which the corresponding instance of the application was caused to be opened on the tablet 600 in response to a gesture received at the camera 620 (a "push" gesture, in the sense that the application is "pushed" from the apparatus that receives the gesture to another apparatus). Other than the push/pull nature of the gesture, these examples may function similarly.

In the examples presented so far, the instance of the camera control application has been transferred from a camera to a non-camera apparatus. However, this is purely by way of example. The control application may be instead (or subsequently) transferred between apparatuses that are both cameras, or of which neither are cameras.

FIGS. 8a-8g illustrate two exemplary apparatuses 800, 850, and each FIG. 8a-8g represents a different way in which the open instance of a first application may be progressively removed from display from a first apparatus 800 and a corresponding open instance of an at least related second application may be progressively displayed on the second apparatus 850. Of course, the corresponding instance may be provided instantly, rather than progressively linked with the progressive nature of a particular user input. Thus, pressing a key, for example, on the first apparatus may instantly provide the corresponding open instance on the second apparatus.

FIG. 8a shows that the user 854 is providing a slide gesture 856 in a diagonal direction from top right to bottom left of the screen of the second apparatus 850. The open instance of the first application 802 is progressively removed from display from the first apparatus 800 and the corresponding open instance of an at least related application 852 is progressively displayed on the second apparatus 850. The user may, in other examples, provide a slide gesture in any direction, for example from left to right, right to left, diagonally, from top to bottom, or from bottom to top. The open instance of the at least related application is progressively displayed on the second apparatus 850 in a direction corresponding to the direction of the user input made. In other embodiments the direction could be inverse to the direction of user input, for example, a left to right input made on the first apparatus (or on the second apparatus) may display the corresponding instance from right to left on the second apparatus. The direction of the user input can be an arbitrary direction which the user may select based on his or her observation of the relative position of the apparatuses being used. Thus, in a case where the transitional effect from the open instance of a first application appearing to as a corresponding open instance of an at least related application is a directional one, the apparatuses need not necessarily know their position relative to the other apparatuses. As a further example, the user, when providing a slide gesture input in any direction, may change their mind and be able to reverse the direction of the slide to provide the open instance of the first application back on the original first apparatus. The user may also be able to 'wag' their sliding finger back and forth and create the impression of the open instances of the first application and the at least related application wagging back and forth between the two apparatuses.

FIG. 8b shows that that a user is providing a "pinch" gesture 806 on the screen of the first apparatus 800. The open instance of the first application 804 is progressively removed from display from the first apparatus 800 and may appear as if being pinched up, similarly to a cloth being pinched in the middle and being lifted up from a surface. The corresponding open instance of an at least related application 858 is progressively displayed on the second apparatus 850, in this example as if pooling out 860 from the centre of the apparatus's display. Other similar transition effects may be achieved, for example, the user may be able to pinch (that is, slide two fingers or a finger a thumb together on the screen of the first apparatus 800) anywhere on the screen, not just in the centre. The effect seen on the screen of the second apparatus 850 may be the pooling out of the displayed open instance of the application on the second apparatus from a corresponding location on the second apparatus's screen.

FIG. 8c shows that that a user is providing a "swirl" (which may also be called a "whirl") gesture 810 on the screen of the first apparatus 800. The swirl gesture may be a spiral or otherwise arcuate gesture with which the user notionally 'swirls' or 'stirs' the content on the display. The open instance of the first application 806 is progressively removed from display from the first apparatus 800 and appears as if being stirred up/swirled around e.g. as if in a whirlpool. The corresponding open instance of an at least related application 862 is progressively displayed on the second apparatus 850, in this example as if unswirling 864 from the centre of the apparatus's display.

FIG. 8d shows that the user 812 is providing a slide gesture 814 from left to right on the display of the first apparatus 814 as if to push the screen over to the neighbouring apparatus 850. The open instance of the first application 816 is progressively removed from display from the first apparatus 800 and the corresponding open instance of an at least related application 866 is progressively displayed on the second apparatus 850. The user may, in other examples, provide a push slide gesture in any direction, for example from left to right, right to left, diagonally, from top to bottom, or from bottom to top. The open instance of the at least related application is progressively displayed on the second apparatus 850 in a direction corresponding to the direction of the user input made 814.

The effects provided due to the user slide inputs 856, 814 made in FIGS. 8a and 8d may, in other examples, be provided by other combinations of user inputs. For example, it may be that to distinguish a slide intended to provide an open instance of an application on a second apparatus from a slide intended to, for example, move to a different home screen on the same apparatus, the user may make the slide all the way across a screen from edge to edge, or possibly from outside one edge of the display to the centre of the display. Such a gesture may be considered to be made outside an application's user interface, since the slide originated from outside one edge of the display of the apparatus running the application. Such a slide gesture may be detected by touch sensors located outside the periphery of the touch sensitive screen (e.g. on one or more edges of the apparatus) and the 'edge' touch sensors may be used to detect the start of the slide user input. As another example, any slide/swipe user input which is detected by the touch sensitive screen as beginning at the outermost touch sensitive area of the touch sensitive display may be extrapolated as having started outside the periphery of the touch sensitive area and be recognised as a user input for providing an open instance of an application on a second apparatus.

In other examples, the user may be required to press and hold for a predetermined period of time before sliding to indicate to the apparatus what the intended effect of the input is (to provide an open instance of an application on a second apparatus). Other possible inputs include, for example, a tap-and-slide, press and slide, a flick, press and flick, a multiple tap and slide or a multi finger slide. Another example may be that an apparatus 800 comprising an accelerometer and/or gyroscope may allow the user to make such an input by tilting the apparatus from left to right (or in another direction). This tilting action may be performed after a prior input priming the apparatus that the user wishes to open a corresponding application on another apparatus. Other inputs are possible as will be appreciated.

It will be appreciated that some form of (e.g. private) sharing network needs to be available between the apparatuses. This can be done prior to receipt of the user input to provide the corresponding open instance, or can be initiated upon the determination that such an input has been received, e.g. after detecting the particular user input, the apparatus which has received the user input may look for apparatuses with which it can form a network to allow for the provision of the corresponding open instance. Such networks may be preconfigured, or the apparatus may ask the user to identify/confirm the apparatus which will provide the corresponding open instance of the at least related application.

It may be that the source (first) apparatus and/or the recipient (second) apparatus may be identified due to the push/pull gesture input made by a user. Other examples of ways of identifying the apparatuses to be involved in providing open instances of applications due to user inputs include that the identity of each apparatus has been previously defined. This may be by a user changing a setting in a menu, or by the manufacturers pre-defining the identity. Another example is that nearby apparatuses may be able to determine their relative distances from each other, and the apparatus determined to be the closest to the apparatus being interacted with by a user in the one which is involved in providing a (corresponding) open instance of an application. A further example is that nearby apparatuses may be able to determine their relative locations from each other, and the direction of the user input made may indicate the other apparatus to be used, for example, indicated by the direction in which the user input is made (e.g. a swipe made in the direction of the recipient apparatus). A further example is in the case of a pull (slide) user input, all the apparatuses available except for the source apparatus (on which the input is being made) may be in a standby state waiting for a user input to instruct them to open a corresponding instance of an at least related application (by an open application being pulled towards that apparatus).

FIG. 8e shows that the user is providing a voice input 814 "Go to tablet" instructing the open instance of the first application 816 to be (progressively) removed from display from the first apparatus 800 and the corresponding open instance of an at least related application 870 to be (progressively) displayed on the second apparatus 850. In this example the apparatus 800 is capable of voice recognition. The user may be able to pre-set names for his or her apparatuses, such as "tablet", "my phone", "screen two", so that the apparatus 800 receiving the user voice input knows which other apparatus (in the network) to instruct to provide an open instance of an application containing the data and transient content. In other examples, the user may be able to provide a 'pull' voice input such as "Switch from my phone" or "Take from desktop" instructing the open instance of a first application to be (progressively) removed from display from the first apparatus (the phone or desktop) and the corresponding open instance of an at least related application to be (progressively) displayed on the second apparatus.

FIG. 8f shows that the user has a key 880 available on a keyboard of the second apparatus 850, which when pressed by the user 878 instructs the open instance of the first application 820 to be removed from display 822 from the first apparatus 800 and the corresponding open instance of an at least related application 874 to be progressively displayed 876 on the second apparatus 850. In this example, the user may be able to configure a key 880 or a particular combination of keys for this purpose. It will be appreciated that the key 880 illustrated in FIG. 8*f* is representative of an already existing key or combination of keys configured for the purpose of providing a corresponding open instance of a related application from an open instance of an application on another apparatus (whether progressively or instantly)

FIG. 8*g* shows that the user is providing a slide gesture 884 by using a peripheral apparatus, in this case, a mouse 888. The user is able to slide the mouse pointer 886 from left to right across the display of the second apparatus 850 when using, for example, a right/left click together with the associated physical movement of the mouse 888 i.e. activation input. The open instance of the first application 824 is then progressively removed from display 826 from the first apparatus 800 and the corresponding open instance of an at least related application 882 is progressively displayed on the second apparatus 850 due to this user input with the mouse 888. The open instance of the at least related application 882 is progressively displayed on the second apparatus 850 in a direction corresponding to the direction of the user input made 884. The mouse pointer 886 may be able to provide the activation input by sliding along any region of the screen. For example, one region of the screen may be configured to accept a press and slide motion in that region as an input for opening a corresponding open instance of an at least related application 882 while removing 826 an open instance 824 from a first apparatus 800. It will be appreciated that such an input from a peripheral apparatus may also be made, for example, via a wand, a pointing stick, a touchpad, a stylus and pad, a joystick or a remote controller.

In the examples where an open instance of a first application is provided as a corresponding open instance of an at least related application by the first application being progressively removed while the at least related application is progressively displayed, the progressions (which give the impression of a transition from one to the other apparatus) of the two applications may be matched. By being matched, it is meant that if, for example, one quarter of the first application is removed by a user input, then correspondingly one quarter of the at least related application is displayed on the second apparatus; similarly as one third of the first application is removed, then one third of the at least related application is displayed on the second apparatus. The speed at which the apparent transition takes place also required that the speed of progressive removal of the open application on the first apparatus is matched by the speed of progressive display of the at least related application on the second apparatus. This progressive apparent transition can take into account any differences in form factor or size of the different displays, as previously described.

FIG. 9 shows a flow diagram illustrating the steps of receiving a user input 902; and based on the user input, based on the user input, providing 904 an open instance of a first camera control application on a first apparatus as a corresponding open instance of an at least related camera control application on a second apparatus FIG. 10 illustrates schematically a computer/processor readable medium 1000 providing a program according to an embodiment. In this example, the computer/processor readable medium is a disc such as a Digital Versatile Disc (DVD) or a Compact Disc (CD). In other embodiments, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The apparatus shown in the above embodiments may be a portable electronic apparatus, a laptop computer, a mobile phone, a Smartphone, a tablet computer, a personal digital assistant, a digital camera, a watch, a non-portable electronic apparatus, a desktop computer, a monitor, a server, or a module/circuitry for one or more of the same.

The portable electronic apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

Any mentioned device/apparatus/server and/or other features of particular mentioned apparatus/apparatus/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned device/apparatus/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for an apparatus, and this can be useful in examples where a apparatus is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same apparatus. In some embodiments one or more of any mentioned processors may be distributed over a plurality of apparatuses. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to preferred embodiments thereof, it will be understood that various omissions and substitutions and changes in the form and details of the apparatuses and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The invention claimed is:

1. An apparatus comprising:
   at least one processor; and
   at least one memory including computer program code, the at least one memory and the computer program code configured to, with the at least one processor, cause the apparatus to perform at least the following:
   receive an indication of a user input;
   based on the user input, cause to provide an open instance of a first camera control application on a first device as a corresponding open instance of at least one related camera control application on a second device, wherein the apparatus is caused to provide the corresponding open instance by providing transient content of the first camera control application on the first device in the at least one related camera control application on the second device, the transient content of the corresponding open instance of the at least one related camera control application is provided to be editable at the at least one related camera control application on the second device, wherein the first camera control application and the at least one related camera control application are configured to control a camera comprised by the first device; and
   cause to progressively display a proportion of the transient content of the corresponding open instance of the at least one related camera control application on the second device based on a characteristic of the received user input.

2. The apparatus of claim 1, wherein the at least one memory and the computer program code are further configured to, with the at least one processor, cause the apparatus to: provide a virtual user interface element on the corresponding open instance of the at least one related camera control application on the second device, the virtual user interface element based upon a physical element on the first device that is not present on the second device.

3. A method comprising:
   receiving an indication of a user input;
   based on the user input, causing to provide an open instance of a first camera control application on a first device as a corresponding open instance of at least one related camera control application on a second device, wherein providing the corresponding open instance comprises providing transient content of the first camera control application on the first device in the at least one related camera control application on the second device, the transient content of the corresponding open instance of the at least one related camera control application is provided to be editable at the at least one related camera control application on the second device, wherein the first camera control application and the at least one related camera control application are configured to control a camera comprised by the first device; and
   causing to progressively display a proportion of the transient content of the corresponding open instance of the at least one related camera control application on the second device based on a characteristic of the received user input.

4. The method of claim 3 further comprising selecting the second device from a plurality of devices based on the user input.

5. The method of claim 4, wherein the second device is selected based upon a direction of the user input, wherein the direction corresponds to relative locations of the first and second devices.

6. The method of claim 3, wherein the user input is received by the first device.

7. The method of claim 3, wherein the user input is received by the second device.

8. The method of claim 3, wherein the proportion of the transient content of the open instance of the first camera control application on the first device and the proportion of the transient content of the corresponding open instance of the at least one related camera control application is correspondingly progressively displayed on the second device based on the characteristic of the user input.

9. The method of claim 3, wherein the characteristic of the user input comprises at least one of: direction of the user input, speed of the user input, extent of the user input, or reversal of the user input.

10. The method of claim 3, further comprising continuing to display the open instance of the first camera control application on the first device after the corresponding open instance of the at least one related camera control application is displayed on the second device.

11. The method of claim 3, wherein the user input comprises a swipe across a touch-sensitive region of the first device or the second device, the swipe beginning at one edge of the touch-sensitive region of the first device or the second device.

12. The method of claim 3, further comprising providing the corresponding open instance of the at least one related camera control application on the second device by providing the same transient content as on the first camera control application on the first device in the at least one related camera control application on the second device.

13. The method of claim 12, wherein the transient content comprises at least one of: a viewfinder view, a digital zoom level, or camera settings.

14. The method of claim 3, wherein the first camera control application and the at least one related camera control application provide a common level of functionality which is provided in the respective open instances of the first camera control application and the at least one related camera control application, and the common level of functionality comprises at least one of: presenting to a user a viewfinder view of the camera, causing the camera to capture a static image, causing the camera to capture a video image, or changing a setting of the camera.

15. The method of claim 3, wherein the first camera control application and the at least one related camera control application are equivalent camera control applications provided using different operating systems of the respective first and second devices.

16. The method of claim 3, wherein the first camera control application and the at least one related camera control application are provided for use on the respective first and second devices by communication with at least one remote server.

17. The method of claim 3, further comprises considering at least one criteria in provision of the corresponding open instance of the at least one related camera control application on the second device, wherein the at least one criteria is based on a display of the first device and a display of the second device each having one or more of: different display sizes, different display form factors, different display resolutions, and different display color schemes.

18. The method of claim 3, further comprising providing a virtual user interface element on the corresponding open instance of the at least one related camera control application on the second device, the virtual user interface element based upon a physical element on the first device that is not present on the second device.

19. A computer program product comprising a non-transitory computer-readable medium which stores computer program code, the computer program code comprising computer-executable program code instructions for:
receiving an indication of a user input;
based on the user input, causing to provide an open instance of a first camera control application on a first device as a corresponding open instance of at least one related camera control application on a second device, wherein providing the corresponding open instance comprises providing transient content of the first camera control application on the first device in the at least one related camera control application on the second device, the transient content of the corresponding open instance of the at least one related camera control application is provided to be editable at the at least one related camera control application on the second device, wherein the first camera control application and the at least one related camera control application are configured to control a camera comprised by the first device; and
causing to progressively display a proportion of the transient content of the corresponding open instance of the at least one related camera control application on the second device based on a characteristic of the received user input.

20. The computer program product of claim 19, wherein the computer program code further comprises computer-executable program code instructions for: providing a virtual user interface element on the corresponding open instance of the at least one related camera control application on the second device, the virtual user interface element based upon a physical element on the first device that is not present on the second device.

* * * * *

UNITED STATES PATENT AND TRADEMARK OFFICE
CERTIFICATE OF CORRECTION

PATENT NO. : 10,171,720 B2  
APPLICATION NO. : 14/369364  
DATED : January 1, 2019  
INVENTOR(S) : Lohan et al.

Page 1 of 1

It is certified that error appears in the above-identified patent and that said Letters Patent is hereby corrected as shown below:

On the Title Page

Insert the following:
--(63) Related U.S. Application Data
Continuation-in-Part of Application No. 13/445,467, filed on Apr. 12, 2012, now Pat. No. 8,996,729--

"(65) Prior Publication Data
US 2014/0375834 A1    Dec. 25, 2014"

Should read:
--(65) Prior Publication Data
US 2014/0375834 A1    Dec. 25, 2014
US 2018/0376049 A9    Dec. 27, 2018--

Signed and Sealed this
Seventh Day of January, 2020

Andrei Iancu
*Director of the United States Patent and Trademark Office*